Jan. 3, 1939.  G. A. BURROW  2,142,174
HYDRAULIC BRAKE
Filed Aug. 24, 1936  3 Sheets-Sheet 1

George A. Burrow
INVENTOR

BY
ATTORNEY

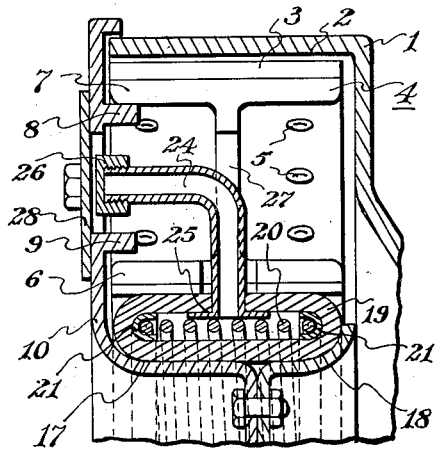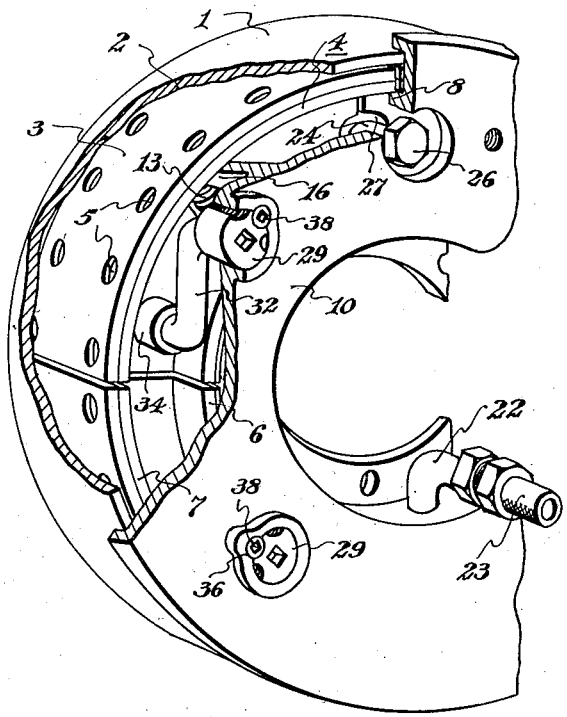

Jan. 3, 1939.                    G. A. BURROW                    2,142,174
                                 HYDRAULIC BRAKE
                              Filed Aug. 24, 1936                3 Sheets—Sheet 3
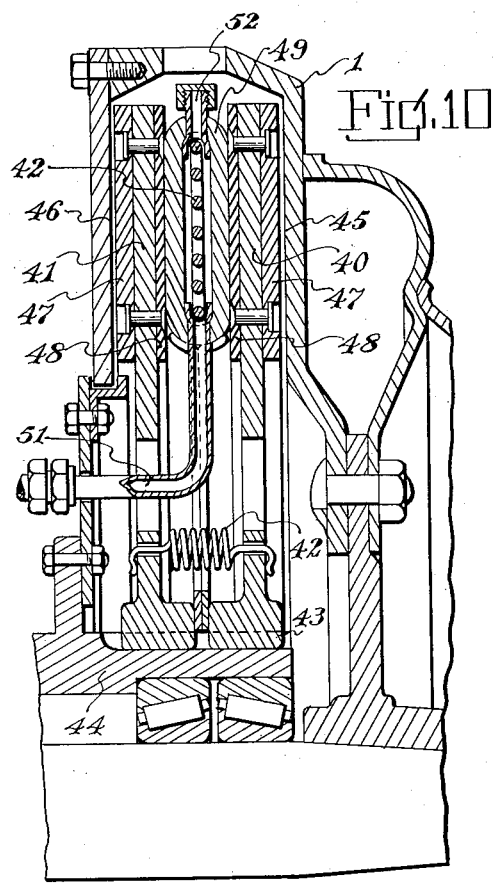
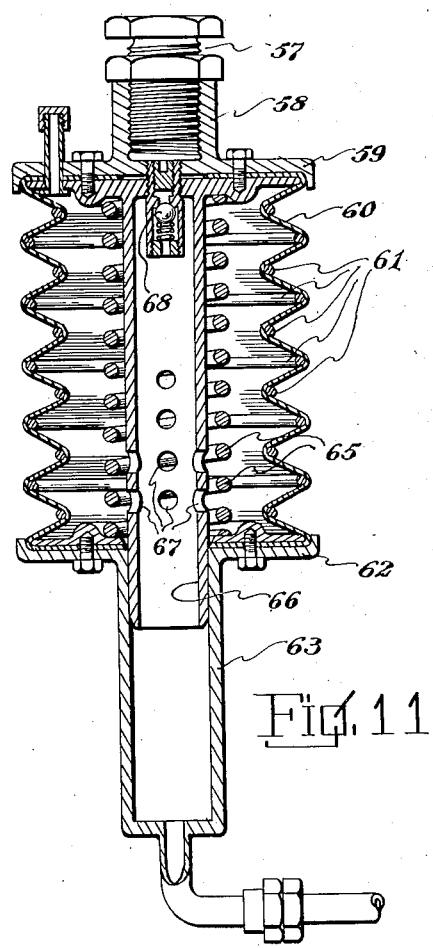
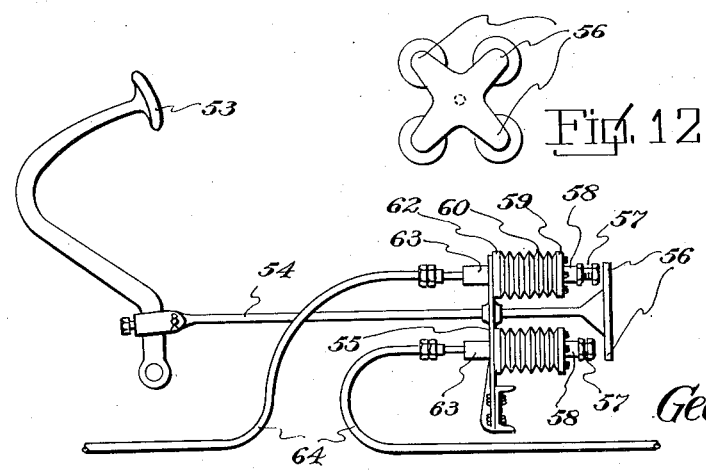
George A. Burrow
INVENTOR
BY Philip A. F. Ferell
ATTORNEY Patented Jan. 3, 1939

2,142,174

UNITED STATES PATENT OFFICE 2,142,174

HYDRAULIC BRAKE

George A. Burrow, Tulsa, Okla.

Application August 24, 1936, Serial No. 97,708

3 Claims. (Cl. 188—152)

The invention relates to hydraulic or fluid brakes particularly adapted for use in connection with vehicles but applicable to various uses, and has for its object to provide a brake wherein the brake shoes are forced outwardly against spring action by an expansive annular member, which brings the brake shoes into engagement with the inner periphery of the brake drum for braking the rotation of the drum.

A further object is to provide means whereby the brake shoes will be caused to uniformly engage the brake drum periphery during the braking operation thereby insuring uniform wearing of the shoes throughout their length.

A further object is to provide an adjustable link connection between the front ends of the shoes and a stationary housing whereby the front ends of the shoes will be caused to engage the brake drum periphery and grip the same with an increasing pressure along with the increasing pressure of the shoes when forced outwardly. Also to provide adjusting means whereby the front ends of the shoes may be adjusted for varied engagements.

A further object is to provide limiting means for the shoes for preventing engagement of the body of the shoe with the brake drum when the lining of the shoe is worn to a predetermined degree, thereby preventing scoring of the brake drum.

A further object is to provide an expansion spring within the annular expansion member for normally maintaining the same flattened under the influence of the pressure exerted on the shoes by their springs.

A further object is to provide insulating means between the shoes and the annular expansible members for preventing heat from the brake drum and shoes from causing deterioration of the annular expansible member.

A further object is to provide bleeder outlets to the various closed parts of the fluid system, whereby, during a filling of the system with fluid, air may be expelled from the system.

A further object is to provide bellows type cylinders for forcing the fluid to the various brakes and adjusting means whereby the time of operation of the brakes may be varied according to the wear on the various brakes.

A further object is to form the bellows cylinders around telescopically engaged tubular members, the inner one of which is provided with a plurality of apertures, said tubular members positively guiding the parts and the apertures allowing a tapering off of pressure at the ends of the brake pedal movement.

A further object is to provide a disc clutch type of brake wherein the annular expansible member is disposed between discs for expanding the same to a braking position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 2:
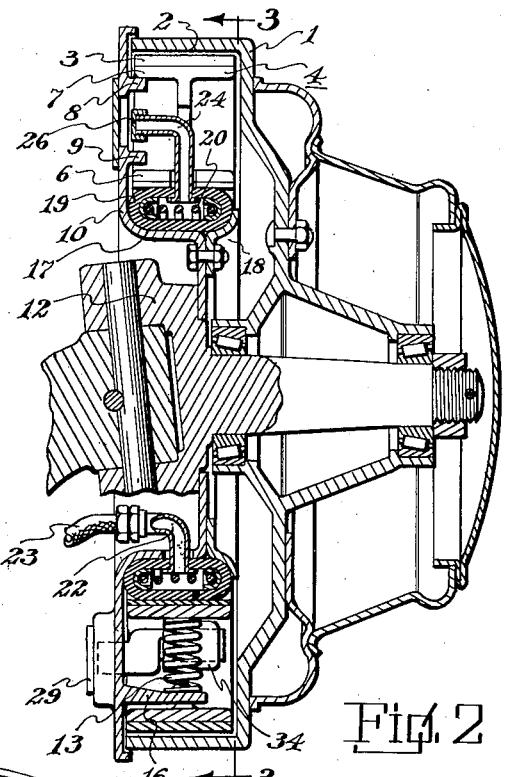
Figure 2 is a vertical longitudinal sectional view through the brake, taken on line 2—2 of Figure 3.
Figure 3:
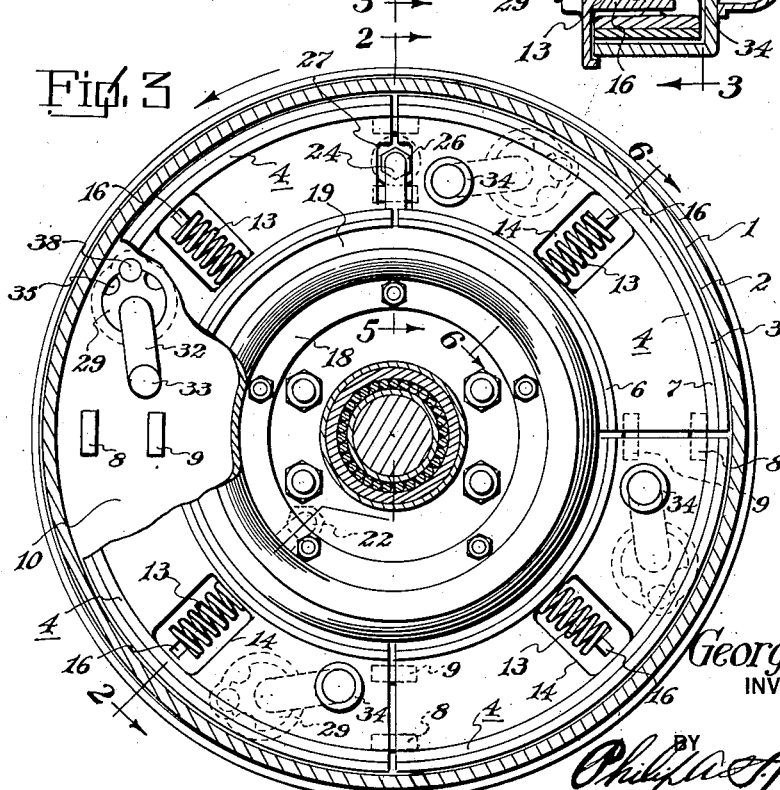

Figure 3 a vertical transverse sectional view through the brake taken on line 3—3 of Figure 2.

Figure 4 is a detail perspective view of the brake, parts being broken away to better show the structure.

Figure 5 is a detail transverse sectional view taken on line 5—5 of Figure 3.

Figure 6 is a detail sectional view taken on line 6—6 of Figure 3.

Figure 7 is a detail front view of a portion of the brake, showing the adjustable link connection between one of the brake shoe ends and the stationary housing.

Figure 8 is a view similar to Figure 7, but showing in dotted lines the brake shoe movement, and link connection.

Figure 9 is a perspective view of the link connection.

Figure 10 is a vertical longitudinal sectional view through one side of a disc type of brake showing the annular expansible member between the discs.

Figure 11 is a longitudinal sectional view through one of the bellows actuating members.

Figure 12 is a rear view of the pedal carried member for compressing the bellows.

Figure 13 is a view in elevation of a conventional form of vehicle brake pedal, showing the brake actuating bellows in connection therewith.

Figure 1:
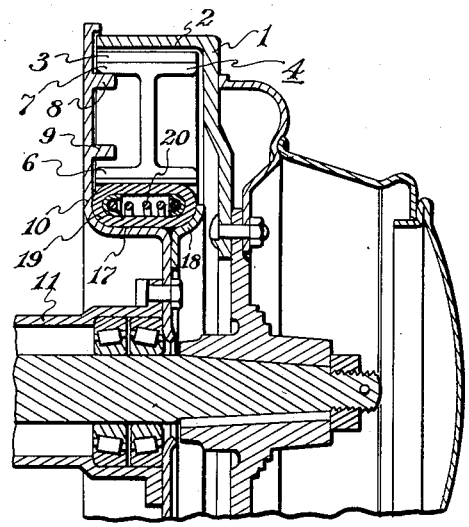
Figure 1 is a vertical longitudinal sectional view through the upper half of the brake.

Referring to the drawings, the numeral 1 designates the brake drum, which may mount a wheel in any way desired. The brake drum 1 is of the internal type and has a braking surface 2, against which the brake shoe linings 3 engage during a braking operation. In the present brake, a plurality of shoes 4 are used, and preferably four as shown. The linings 3 of the shoes are secured thereto in any suitable manner, however conventional rivets 5 are shown for purposes of illustration. The brake shoes are I-shaped as shown in Figure 1, and have spaced flanges 6 and 7, which are in the path of spaced limiting lugs 8 and 9 carried by the stationary brake housing 10, which may be supported on the vehicle in any suitable manner, for instance on the rear axle housing 11, as shown in Figure 1, or on the axle spindle 12, as shown in Figure 2. The brake shoes 4 are limited in their outward and inward movement by the lugs 8 and 9, however the lugs 9 are positioned whereby they do not stop the outward movement of the shoes until there has been an excessive wear on the brake shoe linings 3, but at no time do they allow the brake shoe body to engage the braking surface 2 of the brake drum. It will be noted that the spaced lugs 8 and 9 overlap the adjacent ends of the brake shoes, hence the brake shoe ends are stopped and limited at the same time, and are maintained, when in their inner positions, under the influence of the expansion springs 13 in concentric relation and the same lugs take care of adjacent shoes.

The expansion springs 13, which normally maintain the shoes 4 in their inner position, are disposed in openings 14 in the shoe flanges and are interposed between lugs 15 carried by the shoes and arms 16 extending inwardly from the stationary housing 10. Disposed within a channel 17, formed in the channel housing 10 and by a removable ring 18, is a pliable annular member 19, preferably formed of a rubberized fabric, and which annular member is adapted to be radially extended by the forcing of fluid therein for simultaneously forcing the brake shoes 4 outwardly for a braking operation. Disposed within the annular expansible member 19 is an expansion spring 20, which normally maintains the ring 19 longitudinally extended, as clearly shown in Figure 5, and at which time the shoes are in their inner positions. The end convolutions of the expansion ring 20 are disposed in annular channels 21, which prevent wear on the expansible member 19. Fluid, under pressure, is supplied to the pliable expansible member 19 through an angular pipe 22, extending through the stationary housing 10 and connected to a flexible pipe 23, which leads to fluid supply means. The two upper shoes are provided with a bleeder pipe between their ends, and which bleeder pipe extends radially inwardly and is connected at 25 to the pliable expansible member 19 and forms means, when the caps 26 are removed, for allowing the escape of air during the fluid filling of the system. The bleeder pipes 24 are disposed within recesses 27 in the adjacent ends of the flanges and access may be had thereto through the housing 10 by removing the closures 28. Fluid enters the pliable expansible member 19 through pipe 22 and then expands the member 19, which action will cause a radial outward movement of all the shoes simultaneously until the brake shoe linings engage the brake surface 2 of the drum for the braking operation.

Ordinarily hydraulic brakes are constructed with two brake shoes, pivoted at one of their ends, and controlled by oil cylinders. When pressure is applied to such a structure, the free ends of the shoes are forced against the drum and excessive wear takes place at these ends. With the brake drum revolving in one direction in such a structure, one of the shoes tends to energize itself because of its drag against the drum surface, which causes the free end of the shoe to move further outwardly, whereas the other end tends to close black to ineffective position; all of this gives an uneven wear of the shoes in relation to each other, consequently poor brake efficiency. In the present invention there are four movable shoes, which are so suspended that they are all energized alike and means is provided to adjust the braking effect of the shoes as desired. The adjusting means comprises rotatably adjusted blocks 29 for each shoe and rotatably mounted in bearings of the stationary housing 10. The blocks 29 have pivotally mounted eccentrically therein at 30, the arms 31 of the links 32, said links being provided with arms 33, pivotally mounted in bearings 34 in the front ends of the shoes as clearly shown in Figures 7 and 8. The blocks 29 are provided with threaded recesses 35 in their peripheries, any of which are adapted to be placed in registration with threaded recesses 36 in the bearing 37 for the block, and to receive a holding screw 38 for holding the block in adjusted position after the link connection 32 has been properly adjusted for insuring a uniform clutching or braking engagement with the brake drum surface 2. Three of these adjustable positions are shown in Figure 7. It will be seen by referring to Figure 4 that when the shoes come into contact with the drum surface 2 and the drum is revolving, the tendency will be to assume the position shown in dotted lines in Figure 8, and that the links 32 would tend to straighten out and align themselves with the circumference of the drum.

The crank movement is limited to the point where the shoes come into full contact with the drum, and the energizing effect takes place in the following manner. The shoes, upon contact with the drum, are urged to revolve with it and the crank action tends to straighten out, and in doing so helps to push the shoes tight against the drum.

From the above it will be seen that a brake is provided wherein the shoes will uniformly engage the brake drum, and the link connections will tend to further energize the shoes.

Referring to Figure 10 wherein a modified form of brake is shown, in this form the brake drum 1 has disposed therein, in spaced relation, discs 40 and 41, which discs are normally forced towards each other by means of a contractible spring 42. Discs 40 and 41 are splined at 43 on the stationary housing 44 and are normally out of braking engagement with the drum surfaces 45 and 46. The outer faces of the discs 40 and 41 are provided with linings 47 which cooperate with the drum surfaces 45 and 46 when the discs are forced apart. Secured to the inner adjacent sides of the discs 40 and 41 are insulation discs 48, which act to prevent transmission of the heat incident to the braking operation to the pliable expansible member 49, interposed between the discs, and which expansible member is normally maintained in a flat condition as shown in Figure 10 by a coiled expansion spring 50. Fluid is supplied to the member 49 through a fluid supply pipe 51 and the expansible member 49 is provided with a bleeder pipe 52 for allowing exhaust of air during the filling of the system. In operation, when fluid is forced into the pliable expansible member 49, the discs 40 and 41 are forced outwardly until their linings have a braking engagement with the brake drum surfaces 45 and 46. Upon release of pressure the contractible spring 42 forces the discs together for an unbraking operation.

Referring to Figures 11 to 13 inclusive. In Figure 13 is shown at 53 a conventional form of brake pedal, to which is connected a rod 54, which extends rearwardly through a stationary plate 55 carried by a vehicle, and terminates in a plurality of arms 56, which are in line with the adjustable cylinder heads 57. The adjustable cylinder heads are adapted to be extended to vary the timing of operation of any particular brake, thereby allowing all brakes to be synchronized. It will be noted by referring to Figure 13, that one of the cylinders will have a delayed operation. The cylinder heads 57 are threaded into bosses 58 carried by plates 59, to which is anchored the bellows cylinders 60. The bellows cylinders 60 are maintained in form by internal and external rings 61, therefore collapsing inwardly or outwardly of the walls of the bellows is prevented. Connected to the other ends of the bellows are plates 62 having tubular extensions 63 which terminate in pipes 64, which lead to the brake pipes 22 and 51. Interposed between the plates 59 and 62, within the bellows, is an expansion spring 65, which normally maintains the bellows extended. The plate 59 of the bellows is provided with a tubular extension 66, which is slidably mounted in the tubular extension 63, therefore it will be seen that the bellows will be axially collapsed extended and positively guided during its movement. The tubular extension 66 is provided with a plurality of apertures 67, through which fluid passes during the collapsing and extending of the bellows. It will be seen, however, that as the brake approaches its extreme braking operation some of the apertures 67 will be within the tubular member 63, hence there will be a gradual application of the brake incident to reduced aperture area through which fluid may pass. A check valve 68 is provided in the upper end of the tubular member 66, and which normally closes a passage through which fluid may be forced in filling the system.

The invention having been set forth what is claimed as new and useful is:

1. A brake comprising a drum having a chamber therein, a stationary housing extending into the chamber of the drum, a tubular expansible member carried by the portion of the housing within the chamber of the drum, arcuate brake shoes within the chamber of the drum and engaged by the tubular expansible member and forced outwardly into braking engagement therewith, link connections between the shoes and the housing for insuring uniform gripping of the shoes throughout their length and means for varying the angle of movement of the links for adjusting the self energizing force of the shoes and means for normally forcing said brake shoes inwardly.

2. A brake comprising a rotatable drum, radially movable concentrically arranged shoes within the drum, spring means for normally forcing said shoes inwardly, an expansible, pliable annular member within the drum and adapted to force the shoes outwardly for a braking operation, a housing for said drum and a link connection between the housing and the front ends of the shoes, and forming means for causing a positive braking operation of the shoes throughout their length said link connections comprising arms pivotally connected in off center relation in rotatably adjusted members carried by the stationary housing.

3. A brake comprising a rotatable drum, radially movable concentrically arranged shoes within the drum, spring means for normally forcing said shoes inwardly, an expansible, pliable annular member within the drum and adapted to force the shoes outwardly for a braking operation, a housing for said drum and a link connection between the housing and the front end of the shoes and forming means for causing a positive braking operation of the shoes throughout their length, rotatable adjustable members carried by the housing, said links being pivotally connected to the rotatably adjustable members in off-center position.

GEORGE A. BURROW.